Nov. 25, 1969          C. N. FANGMAN          3,479,929
                         PISTON PIN

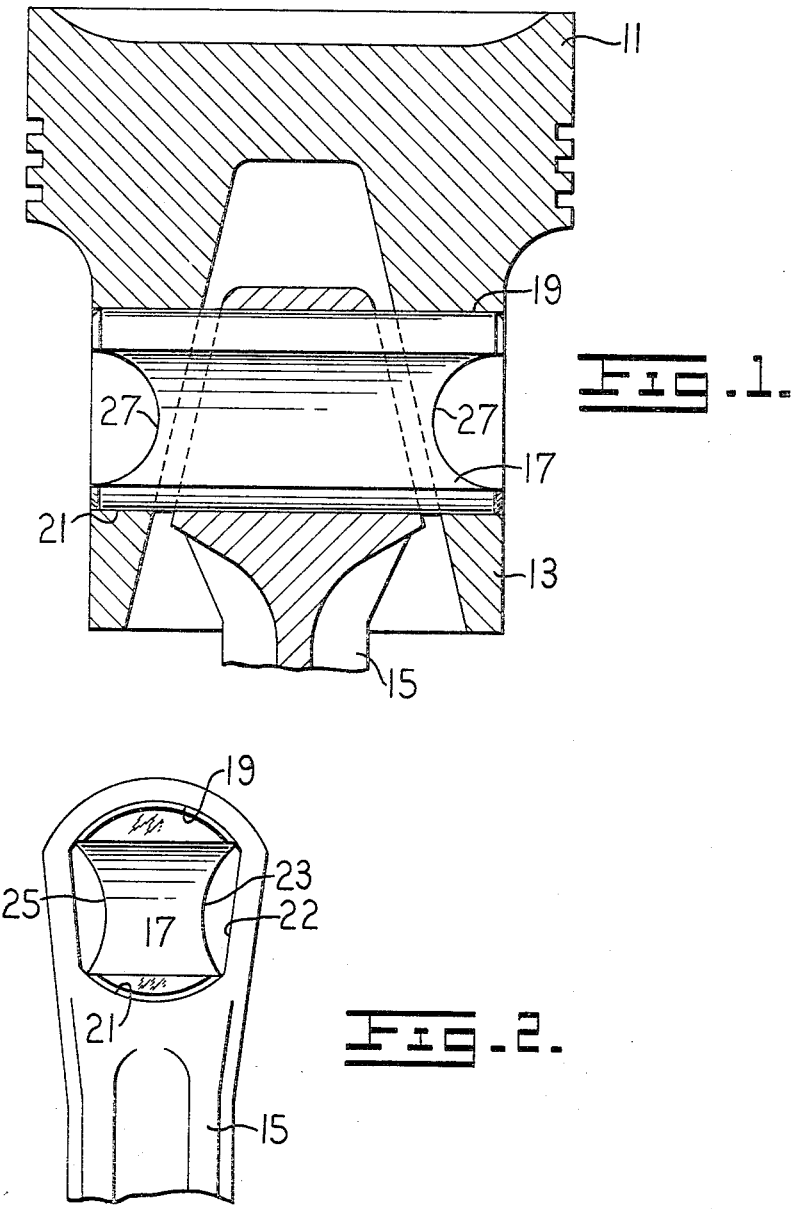

Filed Feb. 19, 1968                        2 Sheets-Sheet 2

INVENTOR
CHARLES N. FANGMAN

BY
Fryer, Tjensvold, Feix, Phillips & Lempio
ATTORNEYS

United States Patent Office 3,479,929
Patented Nov. 25, 1969

3,479,929
PISTON PIN
Charles N. Fangman, Peoria, Ill., assignor to Caterpillar Tractor Co., Peoria, Ill., a corporation of California
Filed Feb. 19, 1968, Ser. No. 706,596
Int. Cl. F16j 1/16; F16b 9/02
U.S. Cl. 92—187                                                              6 Claims

ABSTRACT OF THE DISCLOSURE

A piston pin having an arcuate upper and lower surface joined by concave surfaces along the length and across the ends thereof.

---

With the increased speed and loads of modern engines, it has become necessary to reduce the reciprocating masses of the piston and rod assemblies while providing stronger connecting pins between the piston and the rod.

In the past, these requirements were met by relieving the skirt on the piston and by using a tapered rod end to secure more bearing area between the rod piston and pin. While these measures serve to reduce the mass moving in each cylinder, they also increase the stresses present within the piston, particularly near the upper extremities of the pin and the lower portion of the pin adjacent the tapered edges within the piston.

It is therefore an object of this invention to provide a piston pin which utilizes the improvements found in tapered rod ends and reduced skirt pistons while evenly distributing the stresses occasioned by the reciprocation and thermal expansion of the mass within the cylinder.

It is also an object of this invention to provide a piston pin which may be deformed during use so as to evenly distribute the connection stresses.

Another object of this invention will become apparent to those skilled in the art upon reading the following description in light of the drawings.

With reference to the drawings:

FIG. 1 shows a piston and a portion of a piston rod, both in section, connected by the piston pin of the present invention;

FIG. 2 shows an end view of the pin within the rod;

Figure 3:
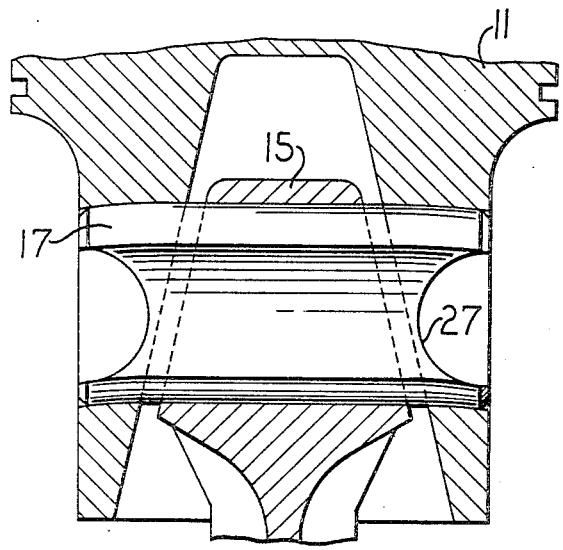
FIG. 3 is a view somewhat similar to FIG. 1 showing, in exaggerated fashion, the distortion that takes place in the piston due to thermal expansion.

In greater detail, FIG. 1 shows a piston 11 having a reduced skirt 13 attached to a piston rod 15 by means of a piston pin 17. The pin is of an I-beam shape having an upper arcuate surface 19 and a lower arcuate surface 21. As shown in FIG. 2, the surface 19 is of a greater dimension than the surface 21 since the forces exerted on it are greater. The aperture 22 in the piston rod is shaped in such a way as to suitably receive the pin.

The I-beam effect of the pin is caused by joining surfaces 19 and 21 by concave surfaces 23 and 25. Further, the ends of the pin 17 are relieved as shown at 27.

Figure 4:
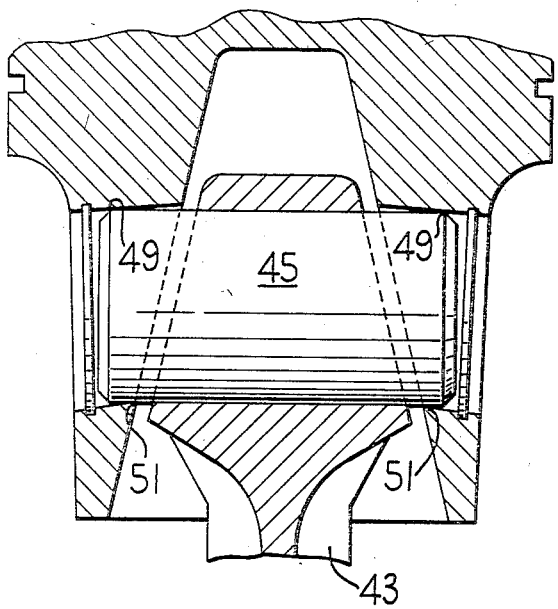
FIG. 4 is a view similar to FIG. 3 wherein a pin, known in the prior art, is used to connect the piston rod and piston.

Referring to FIG. 4, there is shown a piston 41 and a rod 43 connected by a round pin 45.

When an engine is in operation, the top of the piston becomes hotter than the lower portion thereof, causing unequal expansion. Since the expansion at the top of the piston is greater than that in the skirt area, the piston becomes distorted into an inverted conical shape. When this occurs, a round pin such as that shown in FIG. 4 will resist the tendency of the piston to bend it causing concentrated loading between the piston and the pin at points 49 and 51 as shown in the drawings. This high loading will cause scuffing or wear at these points because the oil film separating the piston and pin will be squeezed out at these four places.

Referring now to FIG. 3, it can be seen that the I-beam shape of the pin, together with the relieved ends, allows the pin to be distorted when the piston is acted upon by thermal expansion so that the force exerted between the piston and pin may be distributed throughout that portion of the length of the pin which is in contact with the piston while still allowing a proper oil film to be maintained between them.

In using the I-beam pin construction therefore the applicant has provided a device which, while utilizing a tapered rod and a relieved skirt piston, allows a further reduction in the mass which must be moved due to the various relieved portions of the pin.

What is claimed is:

1. A piston pin comprising an elongated member having a plurality of arcuate surfaces connected by a plurality of concave surfaces.

2. The pin of claim 1 wherein said arcuate surfaces and concave surfaces extend along the longitudinal direction of said elongated member.

3. The pin of claim 1 wherein said arcuate surfaces extend along the longitudinal direction of said elongated member and said concave surfaces extend transversely to the longitudinal direction of said elongated member.

4. The pin of claim 1 wherein said arcuate surfaces extend along the longitudinal direction of said elongated member, some of said concave surfaces extend along said longitudinal direction of said elongated member, and others of said concave surfaces extend transversely to said longitudinal direction.

5. The pin of claim 1 wherein one of said arcuate surfaces is of a greater arcuate dimension than another of said arcuate surfaces.

6. The pin of claim 1 and a piston having an aperture therein into which said pin is inserted and a piston rod having an aperture therein through which said pin is also inserted so that said piston rod may be fastened to said piston.

References Cited

UNITED STATES PATENTS 1,852,663   4/1932   Matthews.

FOREIGN PATENTS 506,891   9/1930   Germany.

CARROLL B. DORITY, Jr., Primary Examiner

U.S. Cl. X.R.
287—20